US006861966B2

(12) United States Patent
Otte

(10) Patent No.: US 6,861,966 B2
(45) Date of Patent: Mar. 1, 2005

(54) METHOD FOR PROVIDING A DIGITAL CURRENT FLUCTUATION SIGNAL

(75) Inventor: Stefan Otte, Witten (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/182,061

(22) PCT Filed: Jun. 1, 2001

(86) PCT No.: PCT/EP01/06219

§ 371 (c)(1),
(2), (4) Date: Sep. 22, 2003

(87) PCT Pub. No.: WO01/95473

PCT Pub. Date: Dec. 13, 2001

(65) Prior Publication Data

US 2004/0027264 A1 Feb. 12, 2004

(30) Foreign Application Priority Data

Jun. 6, 2000 (DE) .......................................... 100 28 003

(51) Int. Cl.[7] .................................................. H03M 1/48
(52) U.S. Cl. ........................ 341/116; 341/112; 341/155
(58) Field of Search ................................. 341/112, 114, 341/116, 117, 122, 155

(56) References Cited

U.S. PATENT DOCUMENTS

| 5,181,232 | A |   | 1/1993  | Take              |         |
|-----------|---|---|---------|-------------------|---------|
| 5,432,421 | A |   | 7/1995  | Kessler et al.    |         |
| 5,825,318 | A | * | 10/1998 | Patapoutian et al.| 341/131 |
| 6,104,331 | A | * | 8/2000  | Ishida et al.     | 341/155 |
| 6,208,497 | B1| * | 3/2001  | Seale et al.      | 361/160 |
| 6,215,435 | B1| * | 4/2001  | Parry et al.      | 341/157 |
| 6,486,809 | B1| * | 11/2002 | Figoli            | 341/141 |
| 6,661,359 | B2| * | 12/2003 | Hernden et al.    | 341/111 |
| 6,693,577 | B2| * | 2/2004  | Yamamoto          | 341/155 |

FOREIGN PATENT DOCUMENTS

| DE | 40 17 779 A1  | 6/1990 |
| DE | 196 02 362 A1 | 1/1996 |
| DE | 197 29 238 C1 | 7/1997 |
| DE | 198 34 108 A1 | 7/1998 |
| EP | 0 730 156 A1  | 1/1996 |

* cited by examiner

*Primary Examiner*—Michael Tokar
*Assistant Examiner*—Linh Van Nguyen
(74) *Attorney, Agent, or Firm*—Brooks Kushman P.C.

(57) ABSTRACT

A method for providing a digital current signal from an analog armature current signal of a motor. The method includes subjecting the analog current signal to an analog-to-digital conversion to produce a first digital current signal having current ripples for each current ripple of the analog current signal. During start-up and run-down motor operation phases, the analog current signal is sampled at a sampling rate which is greater than an expected rate of the current ripples of the analog current signal to produce a second digital current signal having current ripples for each current ripple of the analog current signal during the start-up and run-down motor operation phases. The current ripples of the first and second digital current signals are then compared. The current ripples of the second digital current signal which are in non-conformance with the current ripples of the first digital current signal are evaluated.

7 Claims, 1 Drawing Sheet

METHOD FOR PROVIDING A DIGITAL CURRENT FLUCTUATION SIGNAL

RELATED APPLICATIONS

This application is a 371 of PCT/EP01/06219 filed on Jun. 1, 2001.

FIELD OF THE INVENTION

The present invention pertains to a method for providing a digital current ripple signal from the analog armature current signal.

BACKGROUND ART

The armature current signal of a direct current motor comprises a so-called direct component and an alternating component superimposing the direct component. The alternating component is created when operating the direct current motor as a result of the interaction of the magnet (field), the armature winding, and the commutator of the direct current motor. This becomes apparent in a short-term change of the induced voltage, which results in the fluctuation of the armature current signal. The current peaks contained in the armature signal—hereinafter called current ripples—occur during a rotation of the armature at a frequency corresponding to the number of collector segments.

For example, if the armature comprises ten collector segments, ten corresponding current ripples can be observed in the armature current signal. Counting the current ripples can therefore provide information on the present rotational position of the direct current motor armature and thus also with respect to the element driven by the motor within a predetermined range of motion. For this purpose, an analog current signal is digitized in order to be able to perform the corresponding count. By evaluating the frequency of the determined current ripple, it is possible also to determine the armature speed of the direct current motor.

A method for providing a digital current ripple signal, for example, is described in DE 198 34 108 A1. By applying the method described in this document, the armature signal is sampled during the entire power supply period in a sampling frequency that is considerably greater than the expected maximum current ripple frequency. To prevent the disturbing pulses superimposing the armature current signal from being included in the evaluation of a current ripple count, the analog armature current signal is processed correspondingly prior to being digitized, for example, in that the signal is subjected to a frequency filtering process.

In order to detect a current ripple, the armature current signal is differentiated and subsequently subjected to a differential formation of the minimum and maximum values in a predetermined time interval. From these differential values, the current ripples then are approximately determined by searching the maximum of the differential values or by determining the centers of gravity of the differential values.

A high sampling rate, as provided in the object of this document, is used to sample the analog armature current signal in order to provide the digitized current ripple signal. As a result of the subsequent evaluation of this digitized signal for detecting the actual current ripple, a precise current ripple detection over the entire armature current signal can be performed. However, this method has the disadvantage that a rather powerful computer is required.

Another method for providing a digital current ripple signal is known from the analog armature current signal of a powered direct current motor, in which the analog/digital conversion results from the armature current signal are based on a threshold value. This analog/digital conversion, for example, can be performed in an ASIC, so that merely a computer capacity and performance must be available that is necessary for the evaluation. However, the problem with applying this method is the existence of an adequately precise current ripple determination during the motor's start-up or run-down phase, so that the error rate is much greater during these phases than during the transient operating condition.

SUMMARY OF THE INVENTION

Based on the aforementioned generic method, therefore, it is the object of the present invention to so develop the method, to provide a sufficiently accurate current ripple detection with the lowest possible computer performance over the entire armature current signal and also especially during the start-up or run-down phase of the direct current motor.

The aforementioned object is realized in the present invention, in that after being filtered, the analog armature current signal is subjected to an analog/digital conversion, based on a threshold value, the analog armature current signal is oversampled at a predetermined clock pulse rate during the start-up phase when the direct current motor is switched on and during the run-down phase when the motor is switched off, the oversampling being predominantly limited to these phases, and the current ripple(s) determined from the analog/digital conversion based on a threshold value is/are compared with the current ripple(s) determined from oversampling. If the respective current ripples that have been determined do not sufficiently correspond, the current ripples that have been determined from the oversampling are considered for further evaluation.

The method of the invention provides that the entire armature current signal be subjected to a threshold value based on an analog/digital conversion, for example, performed in an ASIC. The digital current ripples, which are formed during this conversion of the armature current signal, are determined with sufficient reliability. During the start-up or run-down phase of the motor, i.e., when switching on or off the motor, an additional oversampling occurs at a clock pulse rate which is higher than the expected maximum frequency of the current ripple. This clock pulse rate, for example, may have five times the frequency of the current ripple. By applying suitable detection algorithms, the current ripple is detected.

The sampling is limited to the start-up or run-down phase of the direct current motor. During these phases of the direct current motor's operating condition, sufficient power is available, even when using a computer which is merely adjusted to the evaluation requirements of the current ripple in terms of the motor's power, so as to be able to perform this oversampling. By means of this higher resolution digital armature current signal, a plausibility verification of the current ripple during the start-up or run-down phase is performed in the course of the analog/digital conversion, based on the threshold value. This plausibility verification is performed in a comparison between the current ripple(s) determined from the threshold value based on the analog/digital conversion and the current ripple(s) determined from the oversampling.

Further, it is provided that in the case of non-conformance of the detected current ripples, the current ripples determined from the oversampling are included in the further evaluation. By this method, the error rate is reduced considerably when counting the current ripples in the start-up or run-down phase of the direct current motor.

DETAILED DESCRIPTION

Figure 1A:
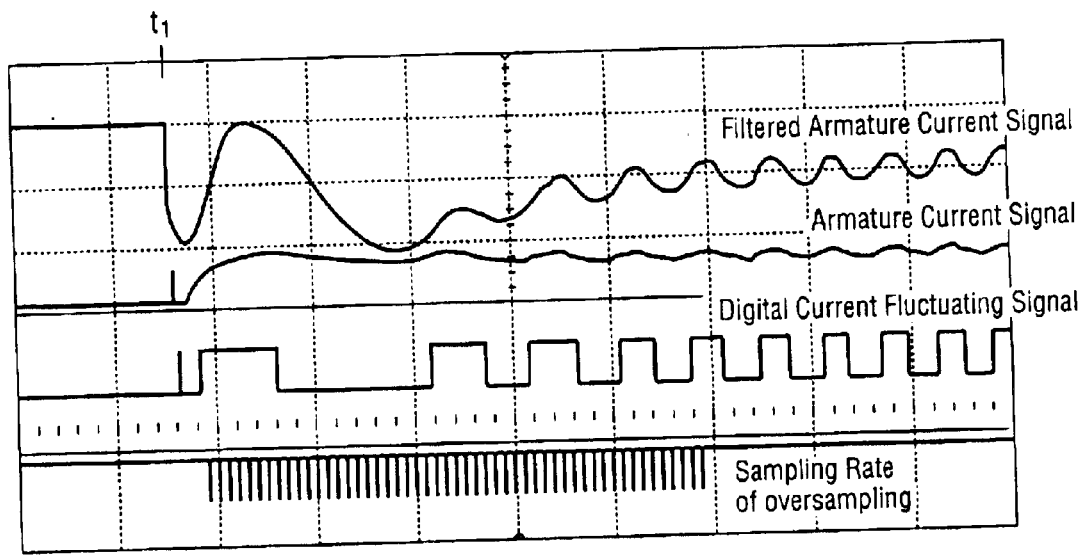
FIG. 1A illustrates a plot of an unfiltered and filtered analog current signal of a DC motor during the stan-up phase of the DC motor, the digital current signal produced by subjecting the filtered analog current signal to an analog-to-digital conversion, and the digital oversampling of the filtered analog current signal during the start-up phase of the DC motor.

The diagram shown in FIG. 1a illustrates three signal curves and, at the bottom, the sampling rate of an oversampling of the filtered analog armature current signal. The central signal curve represents the unfiltered armature current signal. Filtering this armature current signal results in a signal curve, which in this figure is denoted as the "filtered armature current signal". This filtered armature current signal is subjected to an analog/digital conversion based on a threshold value in which this analog/digital conversion can be performed in an ASIC. The curve produced by this method is denoted as the digital "current ripple signal" and represents the armature current signal, especially the current ripple in digital form, which is contained in the armature current signal. The current ripple signal clearly indicates that the frequency of the current ripple increases over time.

This also is substantiated in that prior to the instant, which in FIG. 1 is denoted as $t_1$, the direct current motor is unpowered and switched on only at the instant $t_1$. Within a first operating phase of the direct current motor, the filtered armature current signal is sampled digitally at a predetermined clock/pulse rate, and thus is oversampled in reference to the above-described analog/digital conversion. The sampling rate of this oversampling is represented by the lowest curve shown in FIG. 1a. Further, this curve also indicates the virtual time during which this oversampling operation is performed.

Figure 1B:
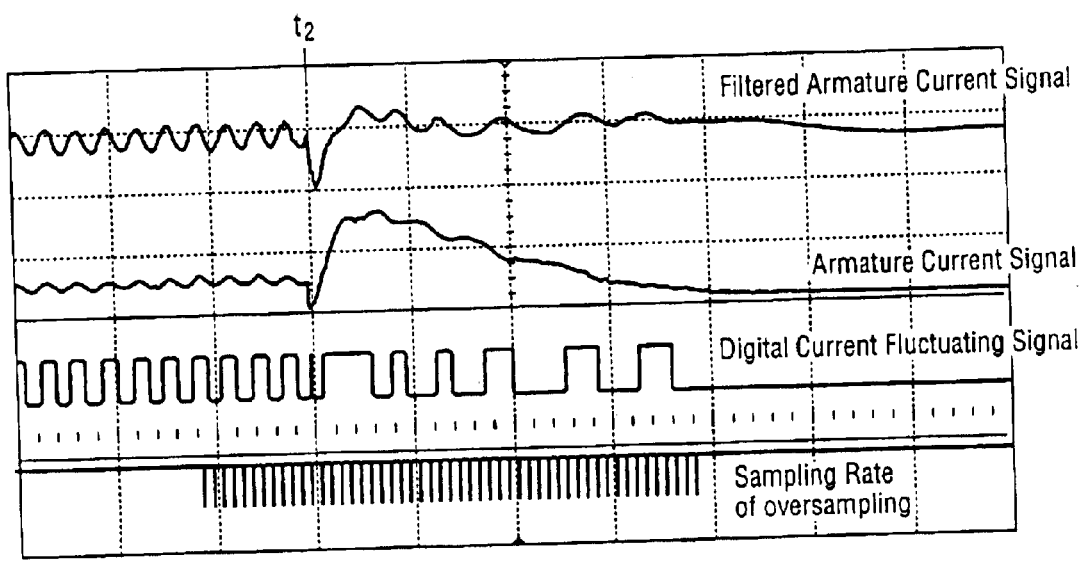
FIG. 1B illustrates a plot of an unfiltered and filtered analog current signal of the DC motor during the run-down phase of die DC motor, the digital current signal produced by subjecting the filtered analog current signal to an analog-to-digital conversion, and the digital oversampling of the filtered analog current signal during the run-down phase of the DC motor.

FIG. 1b shows the same signals when switching off the direct current motor at the instant $t_2$, as well as the oversampling during the run-down phase.

What is claimed is:

1. A method for providing a digital current signal from an analog armature current signal of a motor, the analog armature current signal having current ripples, the method comprising:

subjecting the analog armature current signal to an analog-to-digital conversion based on a threshold value in order to produce a first digital current signal having current pulses for each current ripple of the analog armature current signal;

during a transient phase of operation of the motor, sampling the analog armature current signal at a predetermined sampling rate which is greater than an expected rate of the current ripples of the analog armature current signal in order to produce a second digital current signal having current pulses for each current ripple of the analog armature current signal during the transient phase of operation of the motor;

comparing the current pulses of the first and second digital current signals; and evaluating the current pulses of the second digital current signal which are in non-conformance with the current pulses of the first digital current signal.

2. The method of claim 1 wherein:

the predetermined sampling rate is more than five times the expected rate of the current ripples of the analog armature current signal.

3. The method of claim 1 wherein:

the transient phase of operation of the motor is a start-up motor phase when the motor is switched on.

4. The method of claim 1 wherein:

the transient phase of operation of the motor is a run-down motor phase when the motor is switched off.

5. A method for providing a digital current signal from an analog armature current signal of a motor, the analog armature current signal having current ripples, the method comprising:

subjecting the analog armature current signal to an analog-to-digital conversion based on a threshold value in order to produce a first digital current signal having current pulses for each current ripple of the analog armature current signal;

during a start-up phase of operation of the motor, sampling the analog armature current signal at a predetermined sampling rate which is greater than an expected rate of the current ripples of the analog armature current signal in order to produce a second digital current signal having current pulses for each current ripple of the analog armature current signal during the start-up phase of operation of the motor;

comparing the current pulses of the first and second digital current signals; and evaluating the current pulses of the second digital current signal which are in non-conformance with the current pulses of the first digital current signal.

6. The method of claim 5 further comprising:

during a run-down phase of operation of the motor, sampling the analog armature current signal at a predetermined sampling rate which is greater than the expected rate of the current ripples of the analog armature current signal in order to produce a third digital current signal having current pulses for each current ripple of the analog armature current signal during the run-down phase of operation of the motor;

comparing the current pulses of the first and third digital current signals; and evaluating the current pulses of the third armature current signal which are in non-conformance with the current pulses of the first digital current signal.

7. A method for providing a digital current ripple signal from an analog armature current signal of a motor, the analog armature current signal having current ripples, the method comprising:

subjecting the analog armature current signal to an analog-to-digital conversion based on a threshold value in order to produce a first digital current ripple signal having current ripples for each current ripple of the analog armature current signal;

during a start-up phase of operation of the motor in which the motor is switched on and during a run-down phase of operation of the motor in which the motor is switched off, sampling the analog armature current signal at a predetermined sampling rate which is greater than an expected rate of the current ripples of the analog armature current signal in order to produce a second digital current ripple signal having current ripples for each current ripple of the analog armature current signal during the start-up and run-down motor operation phases;

comparing the current ripples of the first and second digital current ripple signals; and evaluating the current ripples of the second digital current ripple signal which are in non-conformance with the current ripples of the first digital current ripple signal.

* * * * *